United States Patent
Totaro

[11] Patent Number: 6,068,164
[45] Date of Patent: May 30, 2000

[54] HAND GREASE GUN WITH LEVER-OPERATED PISTON PUMP AND TUBULAR GREASE SUPPLY RESERVOIR

[76] Inventor: Luigi Totaro, No. 120, Corso, Vittorio Emanuele - 66041 Atessa (CH), Italy

[21] Appl. No.: 09/117,829
[22] PCT Filed: Feb. 28, 1997
[86] PCT No.: PCT/IT97/00042
     § 371 Date: Aug. 12, 1998
     § 102(e) Date: Aug. 12, 1998
[87] PCT Pub. No.: WO97/32156
     PCT Pub. Date: Sep. 4, 1997

[30] Foreign Application Priority Data

Mar. 1, 1996 [IT] Italy ................................. RM96A0142

[51] Int. Cl.[7] .................................................... B65B 1/04
[52] U.S. Cl. ........................................... 222/389; 222/399
[58] Field of Search ................... 222/389, 386, 222/399, 335

[56] References Cited

U.S. PATENT DOCUMENTS

| | | |
|---|---|---|
| 1,584,863 | 5/1926 | Josepson ................. 222/389 |
| 1,926,398 | 12/1933 | Nielsen . |
| 1,976,061 | 9/1934 | Eastman . |
| 2,463,113 | 1/1949 | Klein . |

FOREIGN PATENT DOCUMENTS 315061  1/1929  United Kingdom .

*Primary Examiner*—Steven O. Douglas
*Attorney, Agent, or Firm*—Smith, Gambrell & Russell, LLP

[57] ABSTRACT

Manual grease gun comprising a tubular reservoir (1) for the grease (7) closed by a rear cover (3), a dual seal pressure piston (10) slidable within the container (1) and a head piece (2) with a reciprocating piston (5) pump manually operated through a lever (6), the suction port of the pump being connected with the interior of said tubular reservoir (1) and the delivery port of the pump being connected with a grease delivery nozzle (8); on the rear cover (3) or on the rear region of the tubular reservoir (1) there is provided a manual reciprocating air compressor (4), the delivery port of which is connected with a rear pressure chamber (12) of the tubular reservoir (1). The diameter of the reciprocating compressor (4) is smaller than the diameter of the tubular reservoir (1), the ratio being preferably below 1/4.

20 Claims, 7 Drawing Sheets

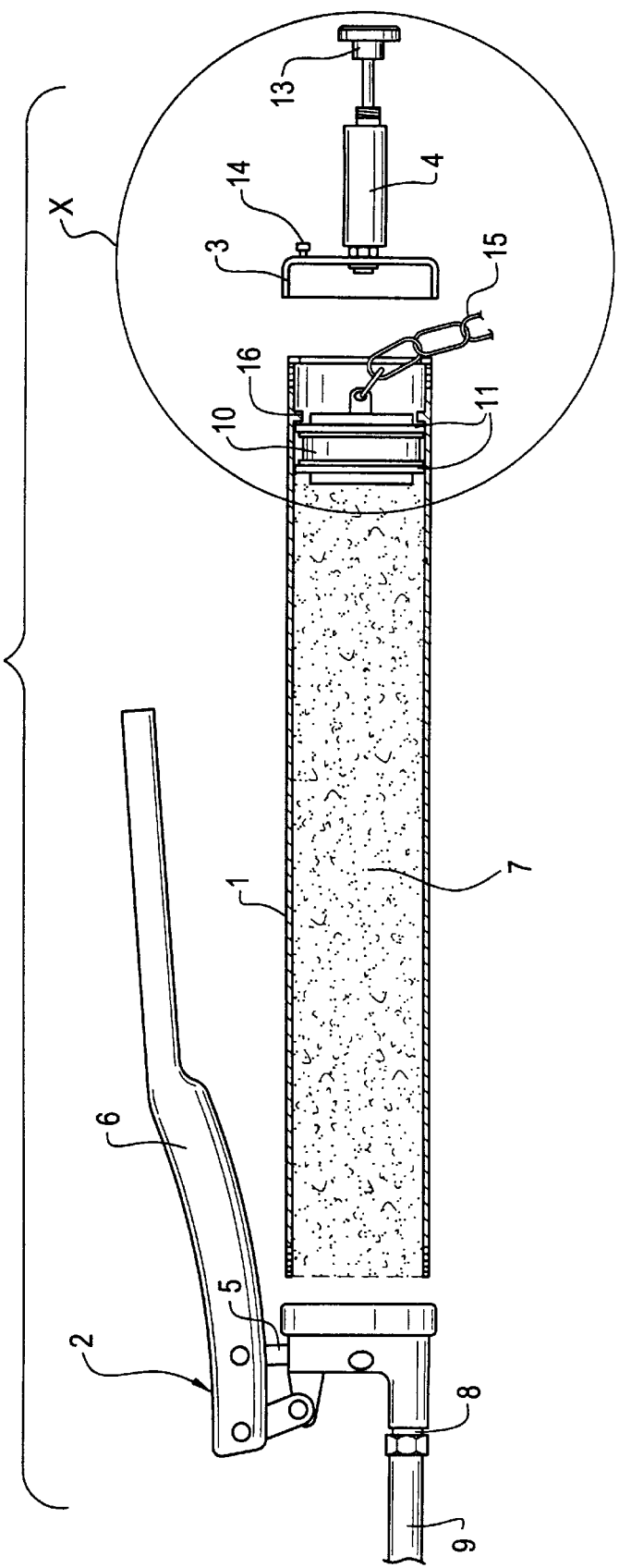

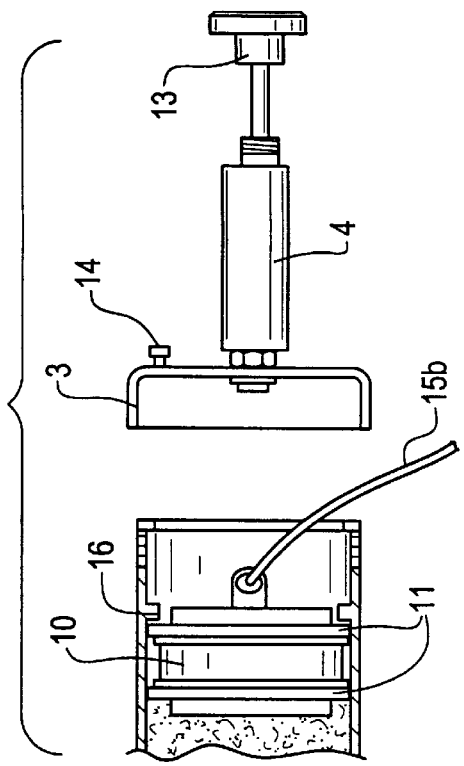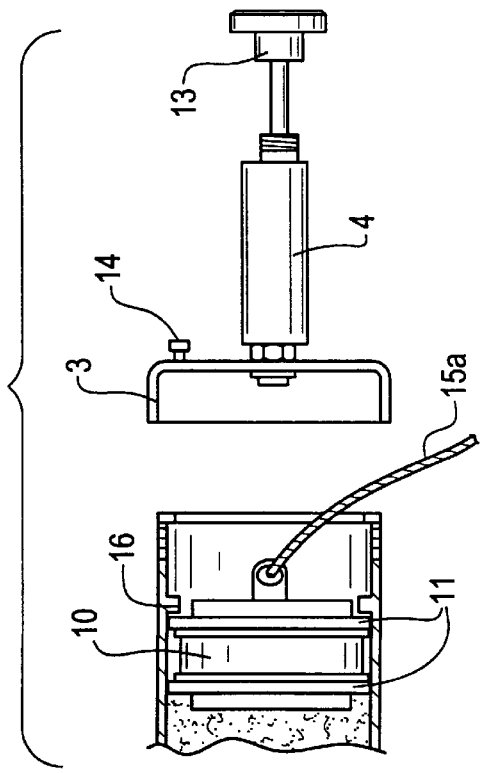

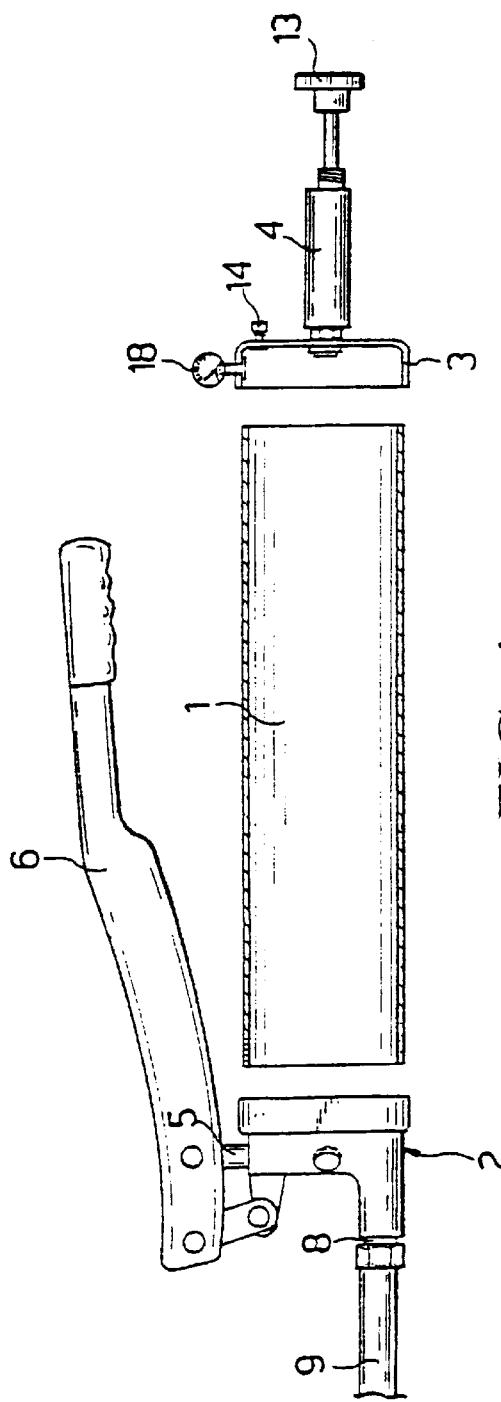
FIG. 4
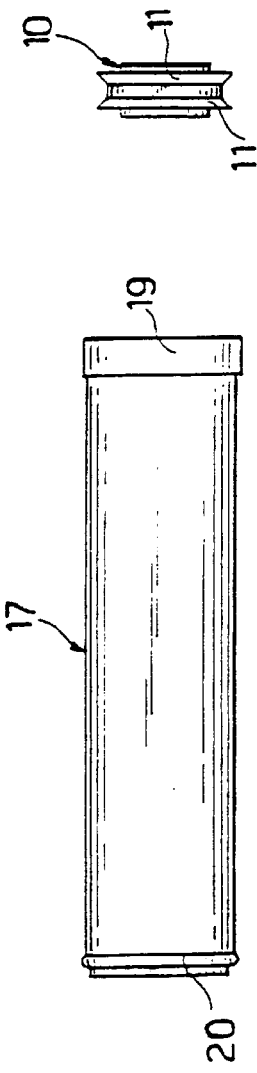
FIG. 5
FIG. 6

HAND GREASE GUN WITH LEVER-OPERATED PISTON PUMP AND TUBULAR GREASE SUPPLY RESERVOIR

BACKGROUND OF THE INVENTION

The present invention concerns a hand greas gun with a lever-operated piston pump and a tubular grease supply reservoir. More specifically, the invention relates to a portable device for pressure delivery of a highly viscous lubricating material, which device substantially consists of a cylindrical container with a supply of the lubricating material, and a reciprocating delivery pump, forming part of the head of the device. The reciprocating pump is manually operated through a lever arm, and is connected with its suction port to the container and with its delivery port to an end dispensing nozzle. Such kinds of devices are also known as syringe grease guns.

As it is known, in the manual grease guns of the kind mentioned above the high viscosity of the material involved makes it necessary to combine the action of the piston pump on the head of the device with a further thrust, which helps the grease mass to flow towards the delivery end of the container, by pressing the mass from the rear end of the container. For this reason, in the most widespread grease guns, either of the type refillable with grease in bulk or of the type for use with commercial grease cartridges, there is provided a back pressure piston, slidable within the tubular container. The pressure piston pushes the grease mass towards the head piece, moving gradually forward as the grease supply diminishes.

In the conventional syringe grease guns, the pressure piston is biased by a helical compression spring, which is housed in the rear region of the cylindrical reservoir. The compression spring is loaded, before filling the container with grease, by pulling a suitable draw rod coaxial to the spring. One end of the draw rod engages the pressure piston at the center thereof, while the distal end of the rod is provided with a hook or a handle, and extends out of the rear end of the cylindrical container. Specifically, to load the grease gun, the head assembly with pump and lever arm is first removed from the device, by unscrewing the screw cap and seal through which the assembly is connected to the front end of the tubular container. Then, the draw rod handle is grasped and the pressure piston is retracted against the bias of the spring, which is thus compressed against the rear inner wall of the container. Normally, the draw rod is provided with a locking element which cooperates with a mating element fixed on the rear region of the tubular container, so that the draw rod may be blocked in its fully retracted position, almost completely extending out of the reservoir, which corresponds to the position of maximum compression of the spring and to that of maximum retraction of the pressure piston within the cylindrical body of the container.

While the pressure piston is being kept in this position, the tubular reservoir is filled with grease in bulk, by manually introducing it from the open front end of the cylinder. In the alternative, the tubular reservoir is loaded with a grease cartridge, which is also inserted from the front end of the cylinder, after having removed both end covers of the cartridge. After closing the device by again screwing the head assembly thereon, the draw rod may be released from its locked position, thus releasing the spring, and the latter may thus exert its pressure, through the pressure piston, on the grease mass in the reservoir. It is clear that, in the simplest case where the draw rod is integral with the pressure piston, the rod protrudes from the rear end of the grease gun a length corresponding to the degree of loading of the tubular container, and is gradually retracted within the container as the grease supply decreases.

During operation, the spring and pressure piston assembly pushes the grease towards the front end of the tubular container. A small aperture is provided on the front end, communicating with the intake port of the reciprocating pump. When the lever of the pump assembly is raised, the pump piston is caused to move backwards in its cylindrical chamber, thus opening the suction port of the pump. This results in a small amount of grease being sucked into the chamber. When the lever of the pump is lowered back, the pump piston pushes this small amount of grease beyond the delivery port of the pump, which is normally closed by a globe check valve. The grease is thus ejected from a nozzle provided on the head of the grease gun, the said nozzle being normally screw-connected to a small flexible hose for dispensing grease in the desired points of the mechanical apparatus receiving the lubricant. The grease transfer into the pump chamber is due to the suction pressure caused by the piston stroke, but it is strongly aided by the pressure exerted by the pressure piston on the whole mass of grease, towards the head of the device.

A manual grease gun of the kind described above, preferably of the type for use with cartridges, is disclosed, e.g., by U.S. Pat. No. 4,298,144. The patent relates to some minor modifications of the conventional device, such as the shape of the locking arrangement for blocking the draw rod in a retracted position, and the provision of a narrow air outlet opening through the screw cover of the head piece, to allow the expulsion of any air entrapped in the grease. In order to reduce the inconvenience caused by the draw rod, in the grease gun illustrated this said document the draw rod is not fixedly connected to the pressure piston, but is slidable within a bore provided on the piston, coaxial thereto. The end restraint is provided by a nut screwed at the end of the draw rod. As a result, when the rod handle is pulled backwards the draw rod entrains the pressure piston with it, thereby causing the spring compression, but, once the container has been filled in and the draw rod is released from its locked position, the draw rod may be reinserted back into the grease mass contained in the reservoir, by sliding with respect to the pressure piston. The latter, on the contrary, is blocked in its totally retracted position by the grease mass filling the container.

Substantially the same type of conventional grease gun with spring-biased pressure piston is disclosed in EP-A-0 379 681. This document concerns the provision, in the grease gun head piece, of a second valve connected to the piston pump chamber. This second valve is endowed with an overpressure indicator, for monitoring any abnormal pressure peaks in the grease gun.

In order to allow the use of cartridges with collapsible containers, which are opened by taking away one cover only, from the end which in use will face the grease gun head, EP-A-0 528 270 proposes a syringe grease gun still of the spring-biased type, but having no draw rod. (As a matter of fact, the draw rod, in the version where it is slidable with respect to the pressure piston, would interfere with the rear wall of the collapsible container.) Instead of the rod there is provided, as a means for pulling the pressure piston towards the back end of the container against the bias of the spring, a flexible cord that is automatically rewind within the grease gun, on a winding spool connected to a spiral spring. The rewinding device is housed within the container, immediately behind the pressure piston, in the region enclosed within the coils of the helical compression spring.

The three prior art solutions referred to above, applied to conventional grease guns with spring-biased pressure pistons, achieve an appreciable reduction of the original hindrance caused by the draw rod in the fully loaded condition of the grease gun. However, these solutions are not free from a number of drawbacks typical of conventional grease guns, essentially due to the use of a mechanical spring means as a source of pressure for pushing the grease of the cylindrical reservoir towards the head piece. As a matter of fact, it is known that the force provided by a spring is proportional to its elongation (or to its shortening, in the case of a compression spring) with respect to its length at rest; therefore, the force that the compression spring may exert decreases as the spring expands, and the maximum pressure is exerted only when the tubular container is totally full. As a consequence, specially at low temperature, when the grease is particularly viscous, the delivery of the last portion of grease contained in the grease gun becomes particularly difficult, since the pressure piston unsatisfactorily cooperates with the piston pump of the head. As the spring is compressed by pulling the draw rod manually, it is evident that the stiffness of the spring cannot be increased too much, not only because the loading would become too difficult, if not impossible, but also because an accidental release of the draw rod locking system during the loading operation would be more and more dangerous. In the current practice, the maximum strength provided by a totally compressed grease gun spring does not exceed 15–20 kg. If one considers that the concerned devices are to be used on the spot, most of the times in the open air and often in very cold weather conditions, it is readily understood that the spring and pressure piston system may cause an unsatisfactory working of the grease gun. Thus, the complete use of the grease supply contained in the tubular reservoir is sometimes prevented.

The above problem becomes more critical if the piston pump is slightly worn out, or if the seals thereof do not perfectly work. In this case, the suction that the piston pump may exert decreases, as air penetrates into the pump chamber during the suction stroke. As a consequence, the amount of grease delivered at each stroke of the lever progressively decreases, and the number of pumping strokes are to be increased accordingly, until the pump finally stops working.

It is also to be taken into account that the spring and pressure piston system, besides being hardly adaptable to any thermal variations in the working conditions, is also scarcely adaptable to any changes in the quality of the grease employed. As a matter of fact, even in favorable weather conditions a grease gun which works satisfactorily with a certain type of lubricating product may turn to work unsuitably if the product is replaced with a more viscous one.

A kind of syringe grease gun wherein the rear pressure piston is not operated by a spring is disclosed by EP-A-0 228 991. This document relates to a device similar to those discussed in the foregoing, but wherein the spring is replaced by an air-tight chamber loaded with compressed air. The chamber is provided in the rear section of the cylindrical container. Compressed air (or any other suitable gas) is introduced in the chamber only once, before the use outdoors, by applying a compressor or a compressed air bottle to a valve provided on the rear end of the grease gun. Between the air-tight chamber and the grease mass contained in the grease gun there is provided a piston of the double-acting type, wherein both sides of the piston are active, and thus at least two annular seals are present. As a matter of fact, the piston must not only push the grease towards the head of the grease gun, but it must also be impervious to the compressed air which presses on the other side thereof. The compressed air is not supplemented during operation, but it must remain permanently entrapped in the air-tight chamber, and therefore the grease gun is not opened by unscrewing its head assembly for refilling it. For this purpose, a grease inlet nozzle is provided on the grease gun head, through which grease is injected in the tubular container by means of a suitable pump.

The device apparently achieves a remarkable reduction of the grease gun volume, as well as a reduction of its production costs, thanks to the elimination of the spring and draw rod assembly. In addition, the device is somehow more adaptable, since the compression supplied to the pressure piston may be adjusted by increasing or by reducing the pressure in the air-tight chamber. In order to obtain this result it is not required, for instance, to change any mechanical component such as a spring. However, since the compressed air supply cannot be supplemented (unless a proper compressor, or at least a compressed air bottle are available on the spot), at each working cycle the pressure exerted on the pressure piston decreases as the latter moves towards the head section, exactly as it happens when a spring is used. Also in this case, the pressure in the air-tight chamber cannot be excessively raised, at least because this would result in rendering prohibitive the refilling operation by pumping grease through the front nozzle.

In addition, the above grease gun is not an autonomous device, but requires on one hand a source of compressed air and, on the other hand, auxiliary equipment (in particular, according to the above patent document, a manually operated grease pump) for refilling it with grease. It is clear, therefore, that this device does not help in satisfactorily overcoming the above mentioned problem of the difficult delivery of grease in critical working conditions. Moreover, the device appears to bring in further practical complications with respect to the refilling of the tubular container. Finally, it is to be noted that the hand gun disclosed can be employed with grease in bulk only, and is not suitable for use with cartridges.

Another hand grease gun wherein the rear pressure piston is operated by compressed air introduced in an air-tight chamber provided in the back section of the cylindrical reservoir is disclosed in U.S. Pat. No. 2,463,113. In this case the compressed air needed for biasing the pressure piston against the grease mass in the reservoir is not provided by an external source, rather it is supplied by a manual reciprocating air compressor mounted on the grease gun. The delivery port of the air compressor is connected to the back pressure chamber of the cylindrical reservoir by means of a flexible hose extending through the whole length of the reservoir, as the air compressor is located close to the head piece of the grease gun. This position of the reciprocating air compressor is due to the fact that the latter is operated from the same lever arm which operates the grease pump. Thus, the oscillating air compressor is pivoted with one end on a fixed support close to the grease gun head, and with the other end (connected with the piston element of the air compressor) on a bracket provided along the lever arm of the grease gun. Accordingly, each oscillation of the lever arm corresponds both to a stroke of the grease piston pump and to a stroke of the reciprocating air compressor.

As a consequence of the above connection of the air compressor to the same lever arm which operates the grease pump, it is not possible to put the rear chamber of the tubular reservoir under pressure independently of the grease pumping process. Thus, at the start of a greasing operation the amount of air behind the pressure piston is insufficient to efficiently prime the grease gun, and the first strokes will unavoidably deliver a reduced amount of grease. Subsequently, as the pumping proceeds, the pressure in the rear chamber continuously and indefinitely increases (the amount of grease pumped per stroke increasing accordingly), and the manual work required at each stroke also increases, without any possibility of disconnecting the air pumping device.

Furthermore, since the air compressor cannot be operated independently of the grease pump, the disclosed device cannot be adapted to variations in the viscosity of the grease treated (either due to changes in the external temperature or to the use of different grades of grease), as the air pressure supplied in the rear chamber cannot be adjusted as desired.

SUMMARY OF THE INVENTION

Accordingly, it is an object of the present invention to provide a hand grease gun device of the type known as a syringe grease gun wherein the pressure piston is not operated by a spring, rather by compressed air, which device may be used outdoors for an unlimited period of time (provided adequate grease supply is available) without needing any auxiliary equipment. The concerned grease gun should allow the delivery of the whole mass of grease present in the tubular reservoir with the same ease, and it should be adaptable with no structural modifications to any viscosity variations in the treated grease. In particular, the concerned grease gun should be adaptable to the remarkable viscosity increase that may occur in cold weather conditions.

To this aim there is proposed, in accordance with the present invention, to render indefinitely restorable the compressed air supply which operates the pressure piston, by incorporating a small manual reciprocating compressor in the rear end of the grease gun. This compressor directly delivers compressed air to the air-tight chamber behind the pressure piston and its operation is totally independent of that of the lever-operated grease gun. The compressor may be of such a small and compact size as to result in a negligible volume increase for the grease gun. Further, it may be operated with the same ease as a bicycle tire pump, or as any other small reciprocating compressor in common use, thus allowing to increase the pressure biasing the reservoir piston during the greasing operation, at any time this may happen to be desirable. It is evident that the presence of the compressor incorporated within the grease gun allows to easily bring back the internal pressure of the pressure chamber to the desired level, starting from atmospheric pressure. Therefore, the grease gun may be opened for refilling it with grease in bulk or with a cartridge, exactly as it is done with conventional grease guns, with no need to inject the grease in the reservoir through a valve.

Therefore, the present invention specifically provides a hand grease gun comprising a tubular grease supply reservoir closed by a rear cover, a pressure piston sealed towards both sides, slidable within the reservoir, and a head piece connected to the front end of the reservoir by means of a circular cap and comprising a reciprocating piston pump which is manually operated through a lever, the suction port of the pump being connected with the interior of the tubular reservoir and the delivery port of the pump being connected with a grease delivery nozzle provided on the head piece, whereby there is provided a manual reciprocating air compressor, the delivery port of which is connected with an inner pressure chamber of the tubular reservoir, which chamber is formed between the rear cover and the pressure piston, the diameter of the reciprocating compressor being smaller than the diameter of the tubular reservoir, characterized in that the reciprocating air compressor is situated on the rear cover or on the rear region of the tubular reservoir and is operated independently of the the piston pump.

Similarly to the prior art devices, the rear cover of the grease gun may be fixed, i.e. It may be integral with the tubular reservoir, or it may be removable from the tubular reservoir, e.g. It may be coupled to the latter by means of a screw joint. As it will be more evident further on, the solution with removable rear cover is particularly suited to the case wherein the grease gun works with grease in bulk, while when cartridges are used the rear cover may also be fixedly closed. In any case, it is to be noted that the grease gun according to the invention may be constructed in such a way as to be employable both with cartridges and with grease in bulk.

According to a preferred embodiment of this invention, the air compressor is placed in the center of the rear cover, with its cylinder coaxial to the tubular reservoir, and it may also be partially embedded within the rear cover, so as to give the grease gun a more compact overall shape. The latter solution takes into account the fact that the the air compressor usually has a quite slender shape, with a diameter which is preferably not greater than ¼ of the diameter of the tubular reservoir. It is evident, thus, that a reciprocating compressor having a small diameter allows one to obtain, within the rear chamber of the tubular reservoir, pressure levels which may be considerable, while requiring from the operator a limited force at each stroke, quite lower than that required to compress the spring of a conventional grease gun. In order to allow the pressure in the rear chamber of the grease gun to be lowered, if desired, a little vent valve communicating with the rear chamber is provided on the rear cover or on the rear region of the tubular reservoir. In addition, a small pressure gauge may also be provided, in the same position, to check the pressure level in the chamber.

If the grease gun according to the invention is designed to work with grease cartridges, when loading the grease gun, both end covers of the cartridge are discarded, and the dual seal pressure piston of the device is inserted within the cylindrical wall of the cartridge, at the rear end thereof. The cartridge is then inserted in the open container from the end facing the head piece and finally the head assembly is screwed again in its position. When, at the end of a cycle, all of the available grease has been delivered, the pressure piston has moved, by sliding within the cartridge, up to the front end of the latter, and it can be easily recovered from the empty cartridge.

If the grease gun according to the invention has to work with grease in bulk, the most practical solution for loading the grease gun consists in completely opening the tubular reservoir, thus unscrewing the rear cover as well, and in filling in the reservoir by suction, by dipping the tubular reservoir in the mass of grease from the front end thereof and retracting the pressure piston towards the opposite end, as it is done when loading a syringe. In order to simplify this operation the grease gun is provided, according to a specific embodiment of the invention, with flexible draw means, such as a chain, a cable or a cord (preferably ending with a ring in order to facilitate the grip), connected to the center of the rear face of the pressure piston. This means, after having been used to retract the pressure piston in the loading step, may be housed in the rear section of the grease gun within the pressure chamber, without causing any hindrance.

Such a loading method is made possible by the fact that the pressure piston of the grease gun is of the kind sealed on both sides. Thus, in the grease suction step the external air cannot penetrate in the container on the side of the grease, bypassing the pressure piston. In order to carry out the loading operation with the utmost ease, and without soiling with grease the external wall of the tubular reservoir, it is preferable that the drum or can from which the grease is taken is provided with a suitable inner delivery cover, which is disclosed in this Italian patent application No. RM96A000143 of the same applicant. This inner cover rests upon the free surface of the grease, is slidable within the drum in a sealed manner, and is endowed with a bore with neck and annular seal, fitting the cylindrical body of the grease gun reservoir. In the loading operation, the cylindrical reservoir is inserted in the neck of the slidable cover, with no need to be dipped in direct contact with the grease mass, and the grease may be sucked in with no air infiltration.

BRIEF DESCRIPTION OF THE DRAWINGS

The structural features and the advantages of the grease gun according to the invention will be clear with reference to some specific embodiments thereof, which are shown by way of example in the accompanying drawings, wherein:

FIG. 1 is an exploded view of a first embodiment of the grease gun according to the invention, with some elements thereof represented in longitudinal section;

FIGS. 1A and 1B illustrate alternative embodiments of Section X in FIG. 1, wherein a cable and a cord, respectively, are used as the means to withdraw the pressure piston;

FIG. 4 is an exploded view of a second embodiment of the grease gun according to the invention, with some elements thereof represented in longitudinal section;

FIGS. 5 and 6 are the side elevation views of a cartridge and of the pressure piston of the grease gun of FIG. 4.

DETAILED DESCRIPTION OF PREFERRED EMBODIMENTS

Figure 2:
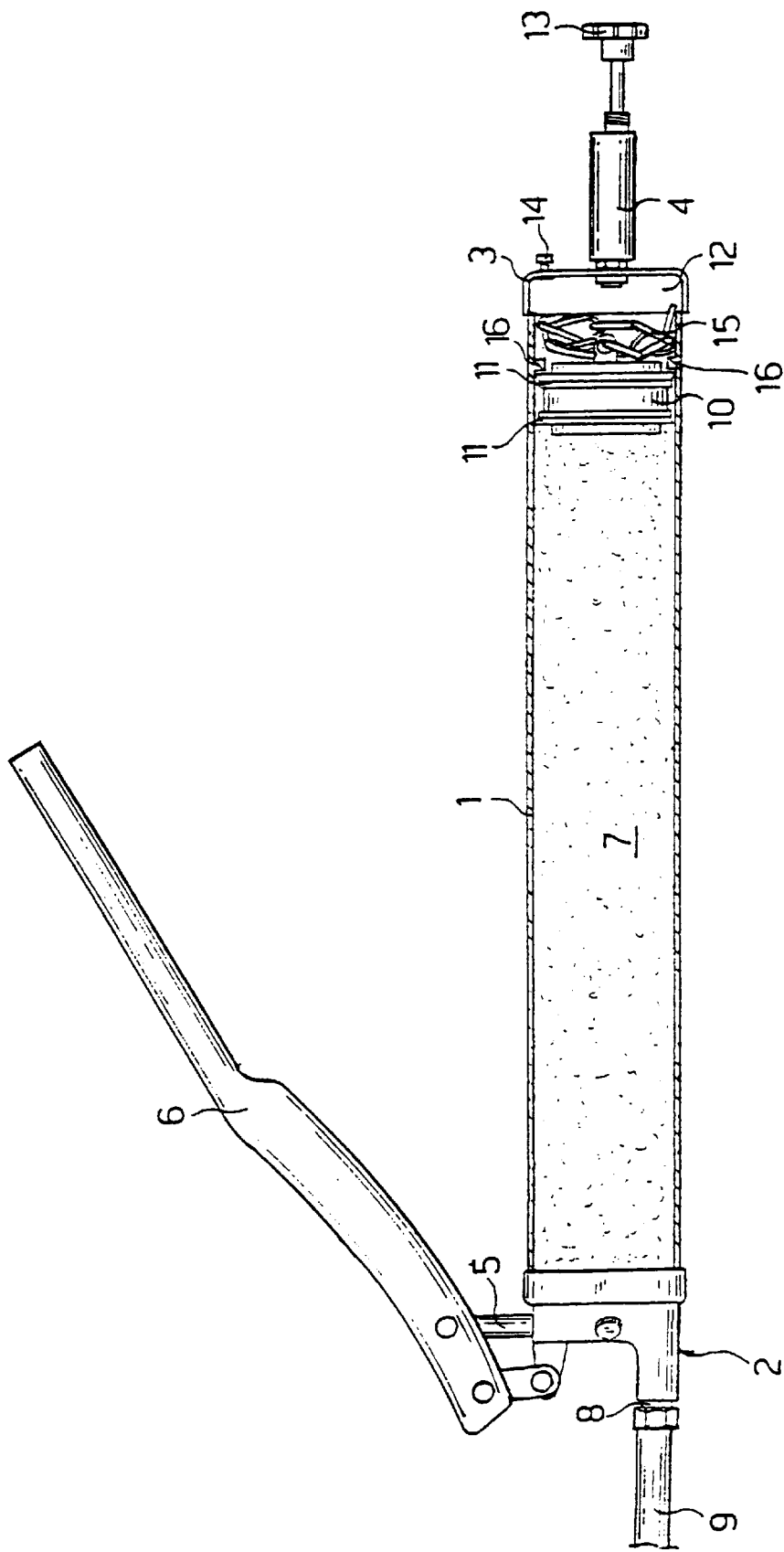
FIGS. 2 and 3 are two side elevation views of the same grease gun assembled, again with some elements in section, in two different working positions.
Figure 3:
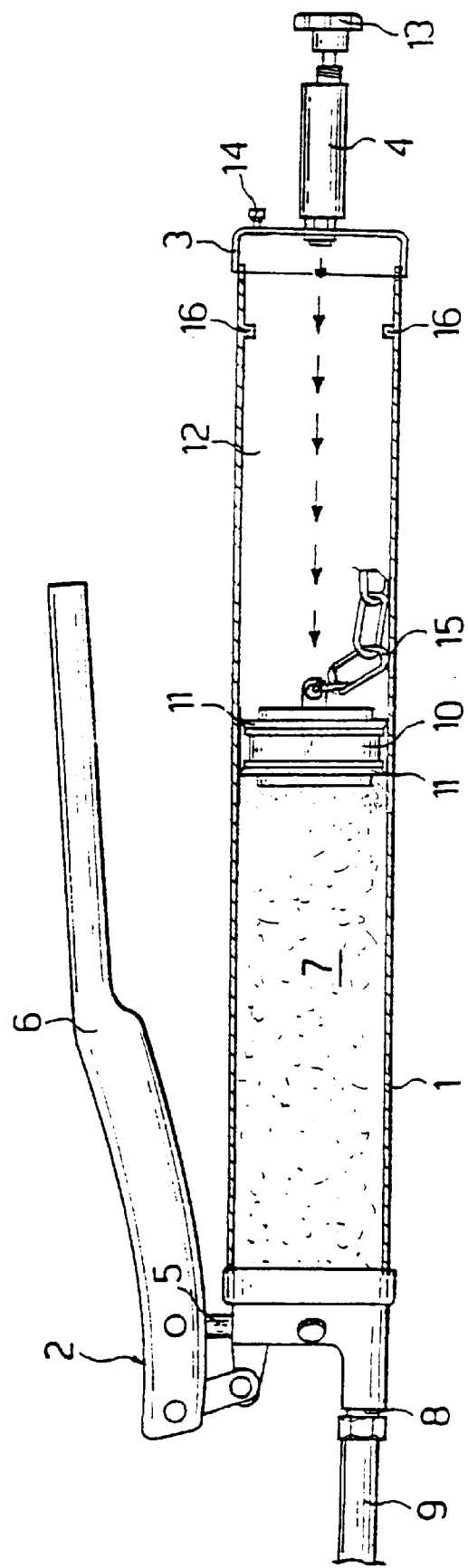
Figure 7:
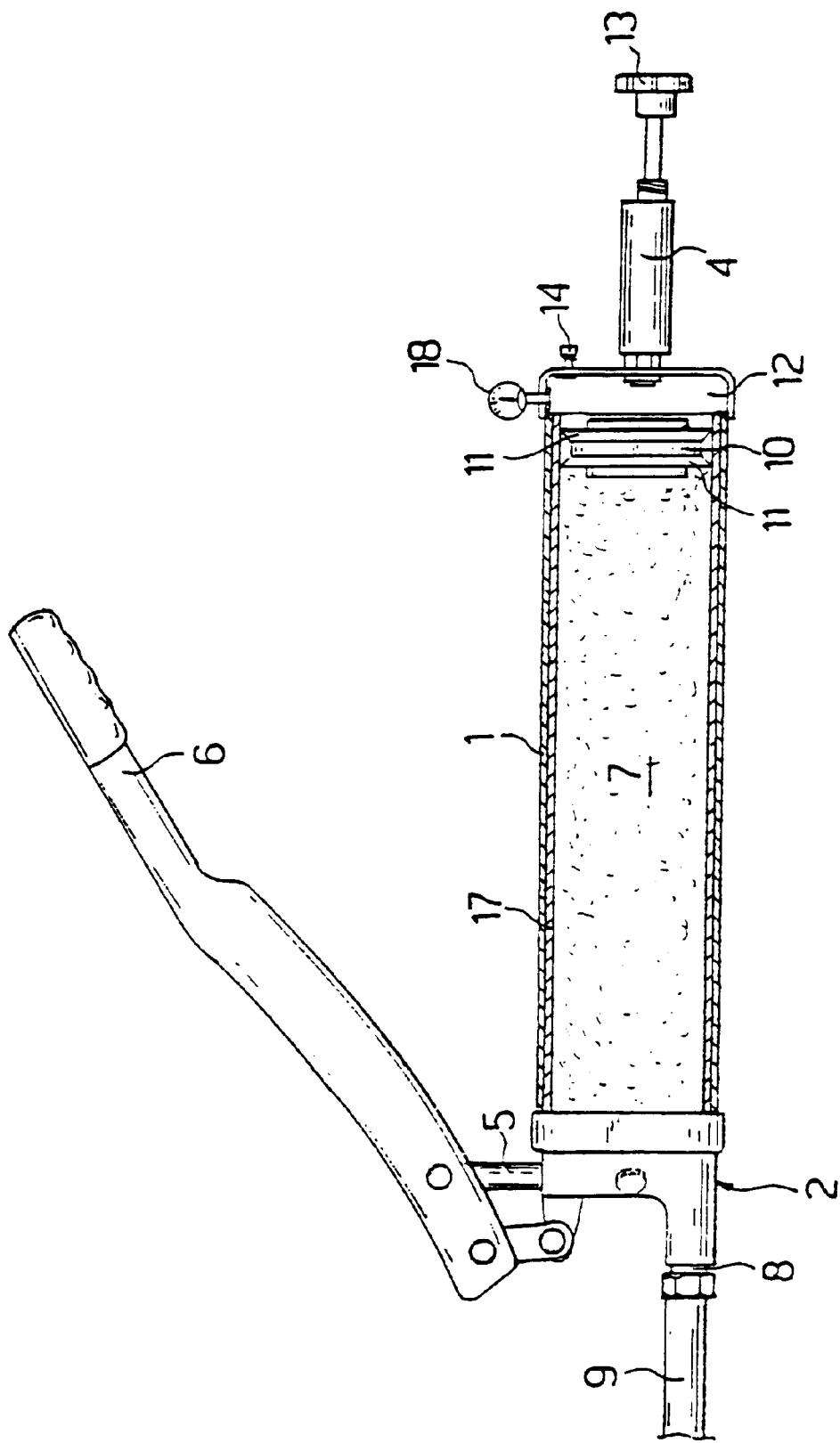
FIGS. 7 and 8 are two side elevation views of the same grease gun assembled, again with some elements in section, in two different working positions.
Figure 8:
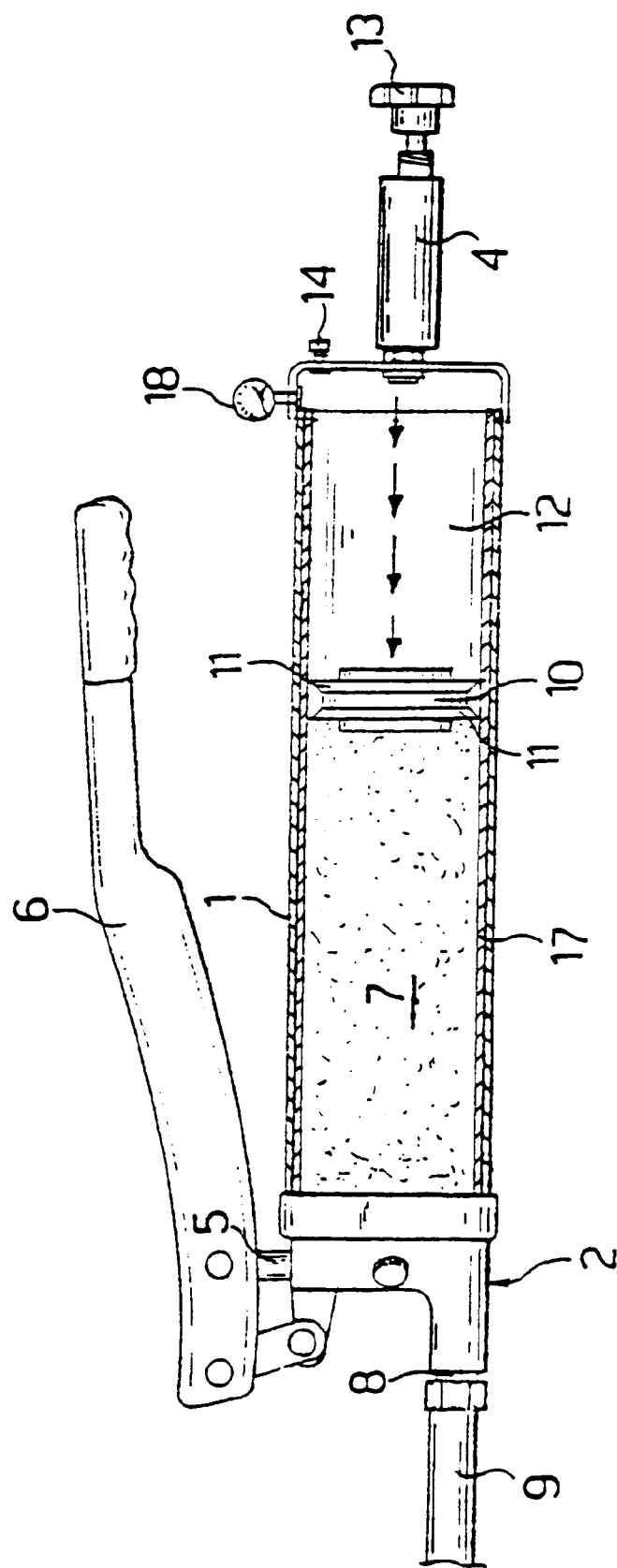

With reference to FIGS. 1-3, an embodiment of the grease gun according to the invention particularly designed to work with grease in bulk consists of a cylindrical container (1), a head piece (2) and a rear cover (3). A reciprocating compressor (4) is mounted on the rear cover (3). The head piece (2), which is shown not sectioned, is of the conventional type, with a manual reciprocating pump whose piston (5) is operated by means of the lever (6). The suction port of the pump communicates with the inside of the cylindrical container (1), wherein the grease (7) is contained, while the delivery port of the pump communicates, through a check valve, with the grease delivery nozzle (8). A flexible hose (9) (partially shown) is normally screwed on the latter, for connecting the grease gun with the equipment to be greased.

Within the cylindrical container (1) a slidable pressure piston (10) is provided, having annular seals (11) on both sides. One side of the pressure piston (10) presses the grease (7), while the other side is biased by the pressure created by means of the reciprocating compressor (4) in the rear chamber (12) of the grease gun (see FIGS. 2 and 3). This rear chamber (12) is comprised between the pressure piston (10) and the rear cover (3). By acting on the knob (13), the compressor (4) can be operated in the same way, e.g., as a bicycle pump. Thus, in the rear chamber (12) of the grease gun the desired pressure level may be established, and the pressure may be restored to the said desired level at times, by operating the compressor (4) as the supply of grease (7) diminishes and the pressure piston (10) is displaced toward the front end of the cylindrical container (1). The internal configuration of the grease gun changes by passing e.g., from a situation such as that shown in FIG. 2 to one as shown in FIG. 3. In the latter figure, the forward movement of the pressure piston (10) is shown by a series of consecutive arrows. In the event that it is desired to lower the pressure level reached in the rear chamber (12), for instance when it is desired to vent the air from the device before opening the grease gun, it is possible to act on the screw vent valve (14), provided on the rear cover (3) of the grease gun.

The loading of grease in the cylindrical container (1) may be carried out by suction in the way described in the foregoing, by dipping the grease gun in the grease and by pulling backwards the pressure piston (10) by means of the chain (15), until the pressure piston (10) abuts against the stop rib (16). As illustrated in FIGS. 1A and 1B, respectively, a cable (15a) or a cord (15b) can be used to pull back the pressure piston (10). The stop rib (16) has the function of preventing the pressure piston (10) from being extracted, during the loading step, from the rear end of the cylindrical container (1). As it may be noticed from FIGS. 2 and 3, the chain (15) does not take any additional space with respect to the overall shape of the grease gun, as it can be stored within the rear chamber (12). In order to facilitate the grip in the loading operation, the chain (15) is preferably provided with a ring-shaped end element (not shown) of a diameter sufficient to allow the insertion of a finger, and of thickness sufficient to provide a contact zone not too thin, so as to offer a comfortable grip when pulling the pressure piston (10). In any case, the ring size is such as not to create excessive hindrance within the grease gun.

The reciprocating compressor (4) can be made out, e.g., of plastics molded in one only piece with the rear cover (3), or it can be assembled by screwing it within a suitable bore provided in the rear cover (3). In any case, it is to be noted that this device may be quite light, cheap and not bulky, and may allow a considerable simplification with respect to the conventional grease guns with metal spring and draw rod.

FIGS. 4-8 show a different embodiment of the grease gun according to the invention, which is designed to work with cartridges, wherein the various elements are substantially the same as those illustrated in FIGS. 1-3 (and are designated by the same reference numbers as in the previous figures). The main differences are represented by the cartridge (17), shown in lateral elevation view in FIG. 5, and by the fact that the pressure piston (10) (individually shown in side elevation view in FIG. 6) is in this case devoid of any chain. A further difference is represented by the additional presence of the pressure gauge (18).

In the loading operation, the cartridge (17) is deprived of its cover (19) and of its bottom (20) and, before introducting the cartridge (17) in the cylindrical container (1), the pressure piston (10) is inserted within the cylindrical wall thereof, on the side which in use will face the rear cover (3). It is also possible to foresee cartridges different from those presently on the market, wherein a disposable piston element of the kind of the pressure piston (10) (i.e., with seals on both sides) is already included in the cartridge. With such a solution it is possible to avoid, with a reasonable additional cost, any contact of the user with the grease contained in the cartridge.

Once the cartridge (17) has been inserted in the grease gun, the latter works exactly in the same way as the grease gun refillable with grease in bulk, shown as the previous embodiment. As the grease (7) is delivered and the grease gun passes from a situation such as that shown in FIG. 7 to one such as that shown in FIG. 8, the pressure piston (10) moves towards the front end of the cartridge (17), from which it may be recovered at the end of the cycle, when all of the grease has been delivered.

As already pointed out, in spite of the fact that the two embodiments shown herein are respectively designed for use with grease in bulk and with cartridges, it is possible to produce a grease gun according to the invention which may work with any one of the two systems, if necessary providing two types of pressure pistons, one with a chain or cord for the suction loading and the other without.

Thanks to the use of the air compressor, very high pressure levels may be obtained in the rear chamber of the grease guns according to the invention, the preferred pressure being comprised, however, between 2 and 3 atm (i.e. about $20 \cdot 10^5$ and $30 \cdot 10^5$ Pa). With such a pressure acting from the back of the grease mass, which is well above that obtainable from a spring loaded with no more than 15–20 kgf in total, the grease spontaneously enters the pump chamber in the head piece, without even needing to be sucked by the pump itself. Consequently, any possible leakage of the pump, due to the wear of its piston or of the relevant seals, does not bring about any reduction in its functionality, as the latter, instead of sucking air from the outside, may just let some very small amounts of grease leak through its worn-out seals.

This, however, will not prevent the pump from continuing working regularly.

It is also evident that, as it is possible to establish the desired pressure level on the back of the pressure piston, the cross-sectional size of the grease guns is no more limited, and their diameter may be increased beyond the current values. An increase of the transversal size of the grease gun above a certain limit is not possible, on the contrary, for the conventional spring-biased devices. In that case, such an increase would require, in order to still have a suitable pressure on the grease mass, a prohibitive increase in the spring stiffness, and an equal increase in the strength necessary to load the grease gun.

The present invention has been disclosed by particular reference to some specific embodiments thereof, but it should be understood that modifications and changes may be made by the persons skilled in the art without departing from the scope of the invention as defined in the appended claims.

I claim:

1. A hand grease gun comprising:

a tubular supply reservoir adapted for holding grease;

a rear cover closing a rear end of the reservoir;

a pressure piston sealingly engaged at both sides with an interior of the reservoir and slidable within the reservoir;

a head piece connected to a front end of the reservoir by means of an end cap, wherein the head piece includes a reciprocating piston pump adapted to be manually operated via a lever, wherein a suction port of the pump is connected with the interior of the reservoir and a delivery port of the pump is connected with a grease delivery nozzle provided on the head piece; and a manual reciprocating air compressor situated on the rear cover or on a rear region of the reservoir, wherein a delivery port of the air compressor is connected with an inner pressure chamber defined between the rear cover and the pressure piston, wherein a diameter of the air compressor is smaller than a diameter of the reservoir, and wherein the air compressor is operable independently of the pump.

2. A grease gun according to claim 1, wherein said rear cover is removably connected to said reservoir.

3. A grease gun according to claim 2, wherein said air compressor is placed in a center of said rear cover, and wherein said air compressor includes a cylinder coaxial to said reservoir.

4. A grease gun according to claim 3, wherein said air compressor is partially embedded within said rear cover.

5. A grease gun according to claim 4, wherein the cylinder of said air compressor has a diameter not greater than 1/4 of the diameter of said reservoir.

6. A grease gun according to claim 4, further comprising an air vent valve provided on said rear cover or on the rear region of the reservoir, the air vent valve communicating with said inner pressure chamber.

7. A grease gun according to claim 4, wherein the cylinder of said air compressor has a diameter not greater than 1/4 of the diameter of said reservoir.

8. A grease gun according to claim 3, further comprising an air vent valve provided on said rear cover or on the rear region of the reservoir, the air vent valve communicating with said inner pressure chamber.

9. A grease gun according to claim 2, further comprising a flexible draw means connected to a rear side of the pressure piston, wherein the draw means is adapted to be contained, in its entirety, within said inner pressure chamber.

10. A grease gun according to claim 9, wherein said draw means is a chain, a cable or a cord.

11. A grease gun according to claim 2, wherein said air compressor includes a cylinder having a diameter not greater than ¼ of the diameter of said reservoir.

12. A grease gun according to claim 2, further comprising an air vent valve provided on said rear cover or on the rear region of reservoir, the air vent valve communicating with said inner pressure chamber.

13. A grease gun according to claim 1, wherein said rear cover is integral with said reservoir.

14. A grease gun according to claim 13, wherein said air compressor is placed in a center of said rear cover, and wherein said air compressor includes a cylinder coaxial to said reservoir.

15. A grease gun according to claim 13, wherein said air compressor includes a cylinder having a diameter not greater than ¼of the diameter of said reservoir.

16. A grease gun according to claim 13, further comprising an air vent valve provided on said rear cover or on the rear region of the reservoir, the air vent valve communicating with said inner pressure chamber.

17. A grease gun according to claim 1, wherein said air compressor includes a cylinder having a diameter not greater than ¼of the diameter of said reservoir.

18. A grease gun according to claim 17, futher comprising an air vent valve provided on said rear cover or on the rear region of the reservoir, the air vent valve communicating with said inner pressure chamber.

19. A grease gun according to claim 1, further comprising an air vent valve provided on said rear cover or on the rear region of the reservoir, said air vent valve communicating with said inner pressure chamber.

20. A grease gun according to claim 1, further comprising a pressure gauge provided on the rear cover or on the rear region of the reservoir, the pressure gauge communicating with said inner pressure chamber.

* * * * *